US007356151B2

(12) United States Patent
Seknicka

(10) Patent No.: US 7,356,151 B2
(45) Date of Patent: Apr. 8, 2008

(54) MICROPHONE SYSTEM

(75) Inventor: Otto Seknicka, Berndorf (AT)

(73) Assignee: AKG Acoustic GmbH, Vienna (AT)

(*) Notice: Subject to any disclaimer, the term of this patent is extended or adjusted under 35 U.S.C. 154(b) by 124 days.

(21) Appl. No.: 11/093,762

(22) Filed: Mar. 30, 2005

(65) Prior Publication Data

US 2005/0232442 A1 Oct. 20, 2005

(30) Foreign Application Priority Data

Mar. 30, 2004 (EP) ................................. 04450073
Mar. 30, 2004 (EP) ................................. 04450074
Mar. 30, 2004 (EP) ................................. 04450075

(51) Int. Cl.
*H04R 3/00* (2006.01)
*H04B 1/00* (2006.01)

(52) U.S. Cl. ....................................... 381/113; 381/119

(58) Field of Classification Search ................ 381/119, 381/122, 355, 91, 92, 95, 111-115, 77, 79, 381/80, 81; 379/390.04, 402; 340/310.11, 340/310.12

See application file for complete search history.

(56) References Cited

U.S. PATENT DOCUMENTS 2,493,819 A 1/1950 Harry
3,707,091 A * 12/1972 Morris et al. ............ 73/514.22
4,541,112 A * 9/1985 Kern .......................... 381/113
4,543,665 A * 9/1985 Sotelo et al. .............. 379/56.3
4,622,692 A * 11/1986 Cole ......................... 381/94.3
4,893,240 A * 1/1990 Karkouti ........................ 701/2
5,459,283 A * 10/1995 Birdwell, Jr. ................ 84/737
5,610,988 A * 3/1997 Miyahara .................... 381/312
6,007,228 A * 12/1999 Agarwal et al. .............. 700/94
6,028,946 A * 2/2000 Jahne ......................... 381/122
6,792,121 B2 * 9/2004 Koyama et al. ............ 381/120
7,024,155 B2 * 4/2006 Gosieski, Jr. .............. 455/3.01
7,170,394 B2 * 1/2007 Chandler et al. ...... 340/310.11

FOREIGN PATENT DOCUMENTS

| | | |
|---|---|---|
| DE | 20 20 739 A | 11/1971 |
| DE | 21 26 385 A | 12/1971 |
| DE | 39 33 870 A | 4/1991 |
| DE | 39 33 870 A1 | 4/1991 |
| EP | 0 096 778 | 5/1983 |
| EP | 0 096 778 A2 | 12/1983 |
| EP | 0 794 686 A2 | 9/1997 |

OTHER PUBLICATIONS

European Search Report for Application No. 04 45 0075.9 dated Jan. 20, 2005.
European Search Report for Application No. 04 45 0074.2 dated Feb. 23, 2005.

* cited by examiner

*Primary Examiner*—Brian Ensey
(74) *Attorney, Agent, or Firm*—Brinks Hofer Gilson & Lione

(57) ABSTRACT

A system remotely controls a microphone through a remote control unit. The remote control unit includes a frequency modulator that modulates a control signal. A cable conductor that is used to provide phantom power also conveys a frequency-modulated control signal. The frequency-modulated control signal and audio signals may be separated.

18 Claims, 10 Drawing Sheets

MICROPHONE SYSTEM

PRIORITY CLAIM

This application claims the benefit of priority from European Patent Application Nos. 044 500 75.9, 044 500 74.2 and 044 500 73.4, filed on Mar. 30, 2004, each of which is incorporated herein by reference in its entirety. The application is also related to U.S. patent applications filed on Mar. 30, 2005, entitled Microphone System and Polarization Voltage Setting of Microphones, and having attorney reference numbers 11336-964 and 11336-867, each of which is incorporated herein by reference in its entirety.

BACKGROUND OF THE INVENTION

1. Technical Field

The invention relates to a microphone and in particular, a system for controlling a microphone.

2. Related Art

A microphone may include a power supply that delivers a DC voltage to the microphone through a cable that conducts audio signals. The cable conductors may connect to a standard connector or plug. A pin in a XLR connector may be connected to ground.

In a capacitor microphone, a polarization voltage may be applied to a microphone membrane. The polarization voltage may be applied to the microphone membrane through a high resistance element.

Microphone parameters, including a polarization voltage may need to be changed. The microphone parameters include the sensitivity of the capacitor microphone, directional characteristics/patterns of the microphone, type of the power supply (e.g., 12V, 24V or 48V), a serial number, calibration data from manufacturers, attenuation of a signal, connectable filters for audio signals, etc. There is a need for a microphone system that may control the microphone parameters remotely.

SUMMARY

A method for remotely controlling a microphone system includes providing power to the microphone electronics through at least two cable conductors of an audio cable and generating a frequency-modulated voltage as a control signal. The method applies a frequency-modulated voltage to the microphone system though the conductors of the audio cable and transmits a command to the microphone electronics through the frequency-modulated voltage.

A system for remotely controlling a microphone system includes two conductors and a remote control unit. The remote control unit includes a parameter control input operable to provide an input for controlling a plurality of parameters of the microphone system and a frequency modulator coupled to the parameter control input. The remote control system further includes a phantom power supply that provides a voltage through the two conductors to the microphone system.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A system remotely controls a microphone system that includes a microphone capsule, an audio amplifier, and microphone electronics. The microphone electronics may include processors, control electronics, A/D and D/A converters, and/or LED displays. A phantom power supply may operate to provide power through two cable conductors of an audio cable. The microphone system may include a power supply for the microphone electronics.

A remote control system includes a parameter control input that provides an input of a plurality of parameters for the microphone system. The remote control system also includes a frequency modulator that modulates a control signal.

To remotely control the microphone system, a frequency-modulated voltage is applied as a control signal via at least one of two cable conductors. A phantom power supply may provide power through the same cable conductors. The frequency-modulated voltage may be superimposed on a supply voltage of the phantom power supply. In the microphone system, this voltage is received as a control signal. The received control signal is evaluated and a command is transmitted to the microphone electronics. Using the frequency-modulated signal transmission, a substantially high data transfer may be achieved.

Figure 1:
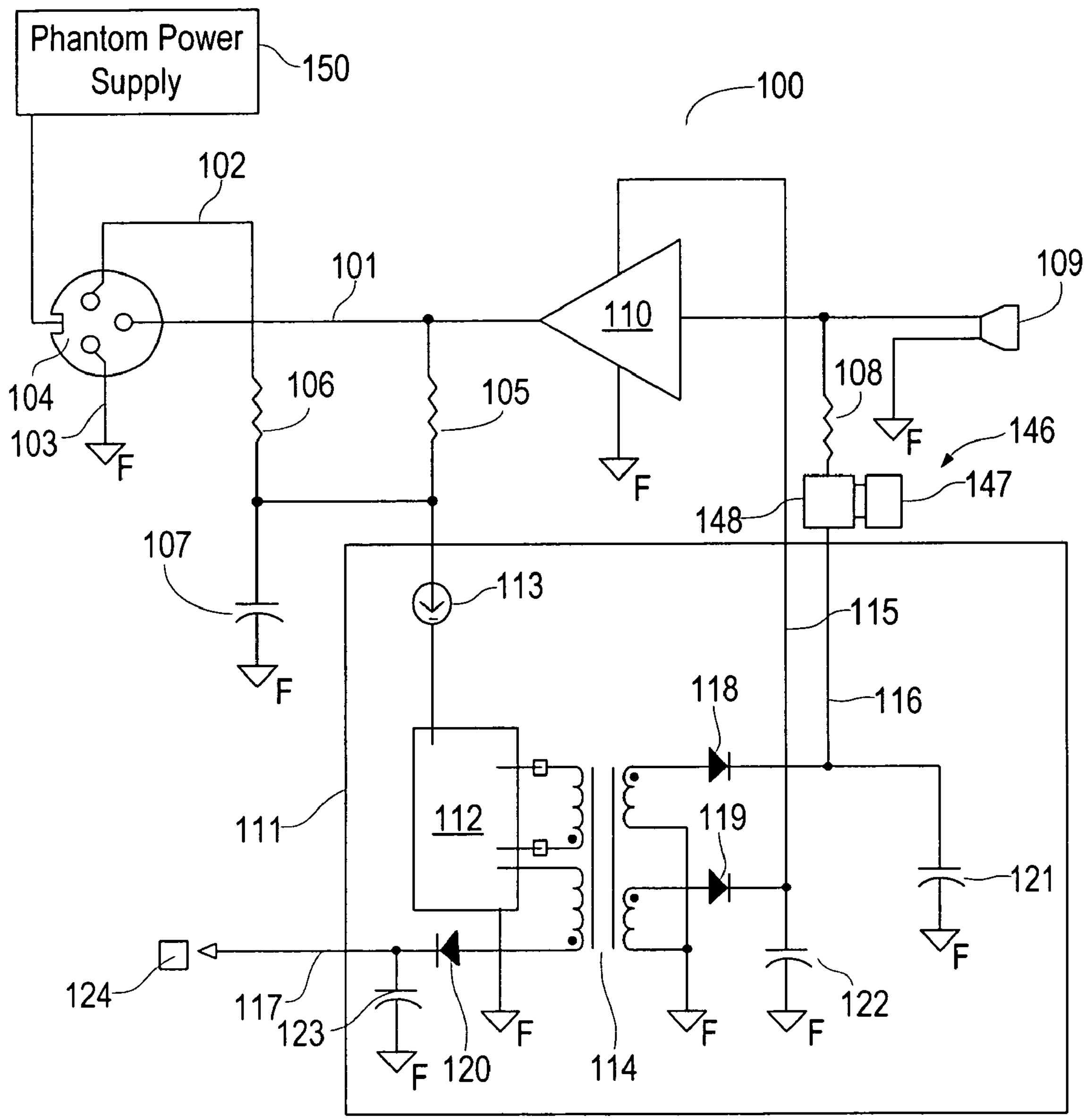
FIG. 1 is block diagram of a capacitor microphone.

FIG. 1 is a block diagram of a microphone system 100. The microphone system 100 may include a capacitor microphone. The capacitor microphone may have a membrane or diaphragm and a back plate or double membranes that form opposing plates of a capacitor. Sound pressure or vibrations may move the membranes. The movement changes the capacitance and generates a changing electric output. A power supply provides a polarization voltage for the capacitor. The power supply may be integrated within a mixer.

Other types of microphones may be used, such as dynamic microphones. A dynamic microphone may include a magnet with coils. A diaphragm is placed adjacent to the coils and moved by a changing sound pressure. The moving coils cause current to flow in the direction of magnetic flux from the magnet. No battery or external power supply may be applied to a dynamic microphone. However, the dynamic microphone may include a phantom power supply to provide power for other electronic circuits in the microphone.

The dynamic and capacitor microphones are analog microphones. A digital microphone may digitize audio signals with an analog-digital converter. Resulting two-channel digital audio signals are transmitted via a symmetrical two-wire conductor to an associated amplifier. A power supply may provide the digital microphone with power via the same two-wire conductor. Pulses may be modulated onto the voltage of the power supply of the microphone. In the analog microphones, an analog signal may be transmitted via the phantom power lines or cable conductors. In the digital microphone, the modulated signals may be simultaneously transmitted with the digital audio signals. The digital audio signal may be easily separated from the modulated signal.

The microphone system 100 may include an audio amplifier 110, a power supply 111 and a phantom power supply 150. The phantom power supply 150 may include a phantom supply unit and feeder resistors of substantially identical magnitude, which are arranged with a 3-pin plug 104 such as an XLR plug shown in a phantom power supply 531 of FIG. 5.

The phantom power supply 150 of FIG. 1 may provide output voltages that range from about 9 volts to about 48 volts. The current consumption of the microphone system 100 may be minimized to restrict voltage drops. Large currents may cause excessive voltage drops across feeder resistors 105 and 106. For example, the maximum current from a phantom power supply 150 with about a 48 Volt output may be about 10 mA. Voltage and current values from phantom power supplies have been standardized according to the DIN EN 61938 Standard (formerly IEC 268). The DIN EN standard is the European standard defined by Deutsches Institut für Normung e. V. and was formerly referred to as the IEC (International Electrotechnical Commission) standard.

Phantom power supplies 150 may provide about 12 Volts, 24 Volts, or 48 Volts. These values are coupled to the value of the feeder resistances 105 and 106. A phantom power supply 50 providing about 12 Volts may have a feeder resistor 105 and 106 value of about 680 Ω, 24 Volts may be matched to about 1.2 kΩ and 48 Volts with about 6.8 MΩ, respectively. The phantom power supply 150 provides power through cable conductors 101 and 102. Cable conductor 103 may be grounded (e.g. “F” identifies a ground connection) through a cable shielding. The phantom power supply 150 may be connected to the power supply 111 through the cable conductors 101 and 102 of an audio cable and resistors 105 and 106. A capacitor 107 may filter a supply voltage relative to ground. The feeder resistors 105 and 106 may be used for decoupling the power supply 111 from the output of an audio amplifier 110.

The feeder resistors 105 and 106 may be additional internal resistances to the phantom power supply 150. When the internal resistance of the phantom power supply 150 matches the internal resistance of the power supply 111, a power adaptation may be performed if the supplied voltage changes. In a power adaptation, half of the voltage of the phantom power supply 150 may be used as a supply voltage for the power supply 111. The supply voltage may be the maximum voltage that the phantom power supply 150 produces. The supply voltage may be distributed by the power supply 111 to other circuit components in the microphone 100. The power supply 111 may be a DC/DC converter. The DC/DC converter may change DC electrical power from one level to another. By way of example, a DC voltage from a battery may be stepped down or up for circuits requiring a different voltage value. After power is distributed to the electronic circuits, excess power may be sourced to the audio amplifier 110. With regard to the different supply voltages such as the 12 Volt, 24 Volt, or 48 Volt supply, the power supply 111 may adapt to a different phantom power supply automatically. The power controller 112 in the power supply 111 may perform the adaptation.

The power supply 111 may include the power controller 112, a constant current source 113 and a transformer 114 connected to the power controller 112. The power controller 112 and the transformer 114 may convert a DC voltage to an AC voltage. The transformer 114 may form an oscillator with the power controller 112. Alternatively, an alternating current may be generated by the power controller 112, independent of the transformer 114. The transformer 114 may convert the alternating current into individual output voltages.

The AC signal may have a frequency in the range of about 100 kHz to about 130 kHz. The AC signal may oscillate freely within a predetermined range of about 100 kHz to about 130 kHz. Preferably, the frequency range of the AC signal is above of the frequency of the audio signals. If the frequency of the AC signal overlaps the frequency of the audio signals, some audio content may be lost or become garbled with the resulting interference. The interference may not be eliminated with simple filtering techniques.

Figure 5:
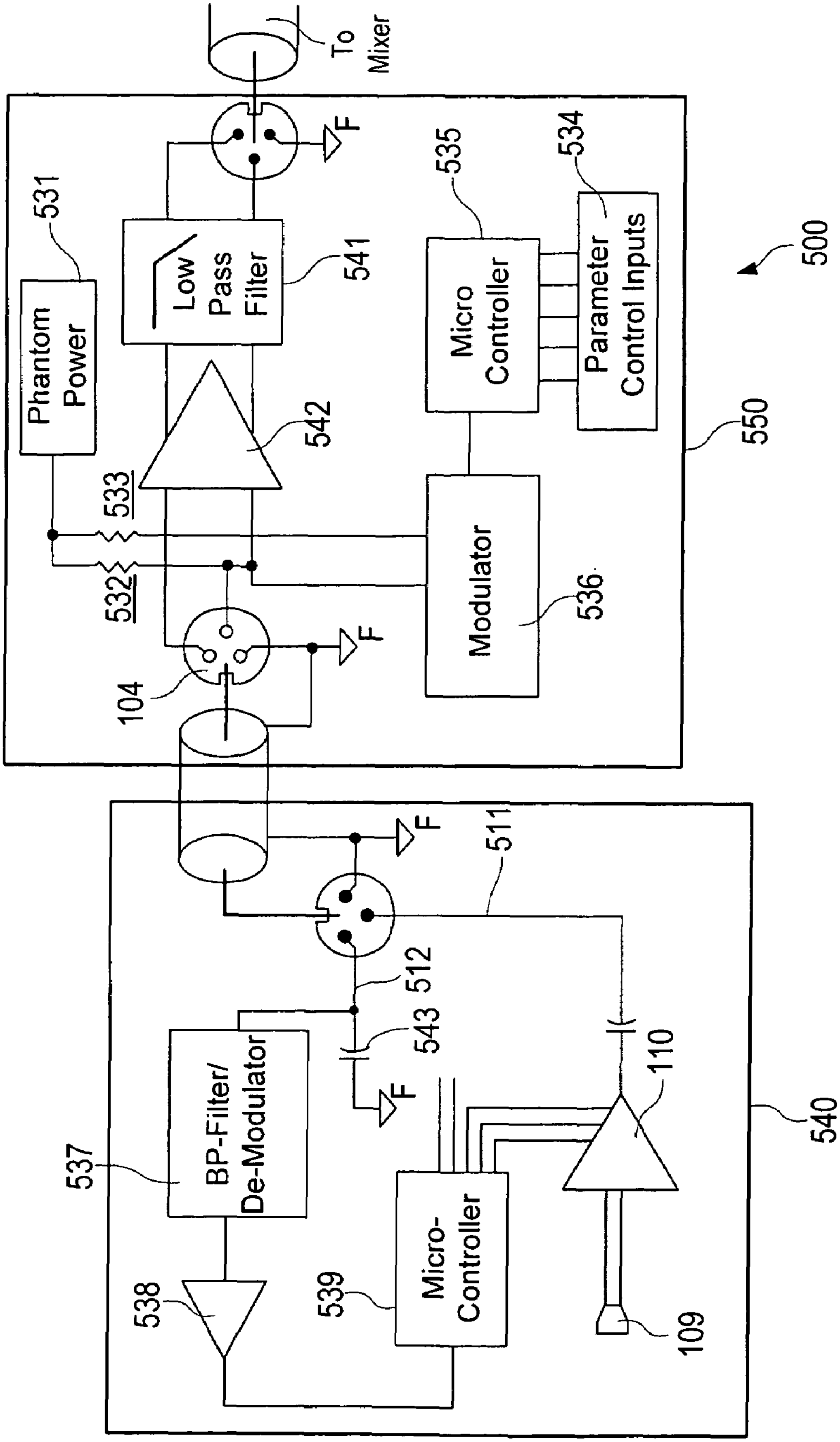
FIG. 5 is a block diagram of a capacitor microphone connected to a remote control unit.

An AC signal with a frequency of about 100 kHz~130 kHz may be used as a clock pulse for microphone electronics, such as microphone control electronics 539 in FIG. 5. Interfering signals may be minimized because the AC signal and the control electronics operate on a common frequency.

Where the power controller 112 generates the AC signal, the AC signal may be fed to the transformer 114. Secondary coils on the transformer 114 may create separate current loops 115, 116 and 117 supplying power to other circuit components in the microphone system 100. The supply loop 116 may provide a polarization voltage to a microphone capsule 109 through a resistor 108. Another current loop 117 may be coupled to a logic supply 124.

Each loop 115, 116, and 117 may be supplied with a different voltage from an individual secondary coil without degrading the supplied power to other circuits such as the audio amplifier 110. The diaphragm of the microphone capsule 109 may continue to receive a high voltage relative to the other circuits even if the current through the power supply 111 increases. The higher voltage may be provided by increasing the number of windings in a secondary coil that supplies the polarization voltage to the microphone capsule 109.

Diodes 118, 119 and 120 and capacitors 121, 122 and 123 are provided in the supply loops 115, 116 and 117. The diodes 118, 119 and 120 may be rectifier elements that convert AC voltages to DC voltages. Other rectifier circuits may be substituted. The uncoupling of the voltage loops 115, 116 and 117 may minimize power loss and provide different voltages supplied simultaneously to the components that require various voltages and current. For example, a high voltage and small current may be supplied as a polarization voltage, a moderate voltage and a moderate current may be supplied to an audio amplifier 110, and a small voltage and large current may be supplied to the microphone electronics.

With this power supply 111, the microphone system 100 may provide added functions such as remote control or automatic compensation. Even with the added functional capabilities, the audio output power may be maintained. The polarization voltage may be maintained at a constant voltage when a secondary coil supplies the voltage to just the microphone coil 109.

The phantom power supply 150 may be used for other types of microphones including dynamic microphones. The dynamic microphones may not need a polarization voltage and the associated supply loop 116 may be eliminated. In this configuration, the phantom power supply 150 may supply power to the microphone electronics.

The constant current generator 113 may supply a constant primary current. The constant current generator 113 may function as a constant current sink for the phantom power supply 150 and as a constant current generator for the power supply 111. The constant current generator 113 may have a high impedance level that filters the noise produced during DC/AC conversion and prevent interference from disrupting the audio signal.

Figure 2:
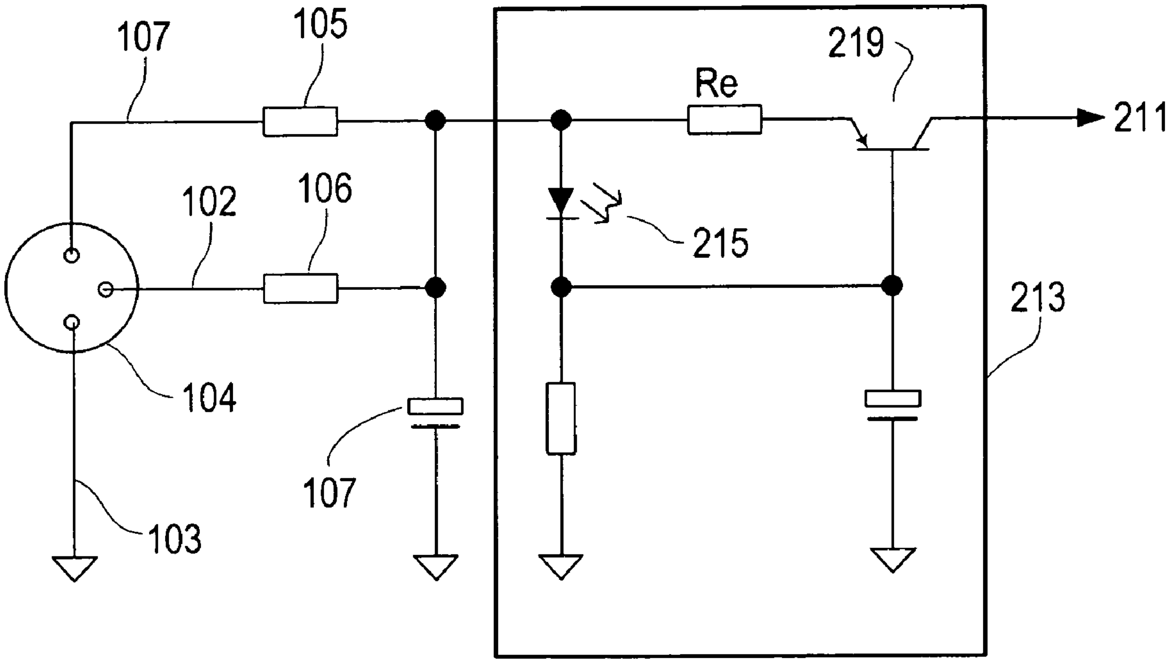
FIG. 2 is a circuit diagram of a transistor and LED constant-current circuit.

FIG. 2 is a block diagram of a constant current generator 213. The constant current generator 213 may be a transistor-light emitting diode ("LED") combination. The transistor may be a bipolar transistor 219. The constant current may forward-bias the LED 215 developing a constant voltage across the junction of the LED 215. The constant voltage is applied across the parallel combination of the emitter-base junction of the bipolar transistor 219 and the emitter resistance Re. The constant current developed by this arrangement may be determined by the following:

$$I_{213}=(U_{LED}-U_{be})/Re \tag{1}$$

where $U_{LED}$ is the voltage across the LED 215, $U_{be}$ is the base emitter voltage at the transistor 219, and Re is the emitter resistor.

Figure 3:
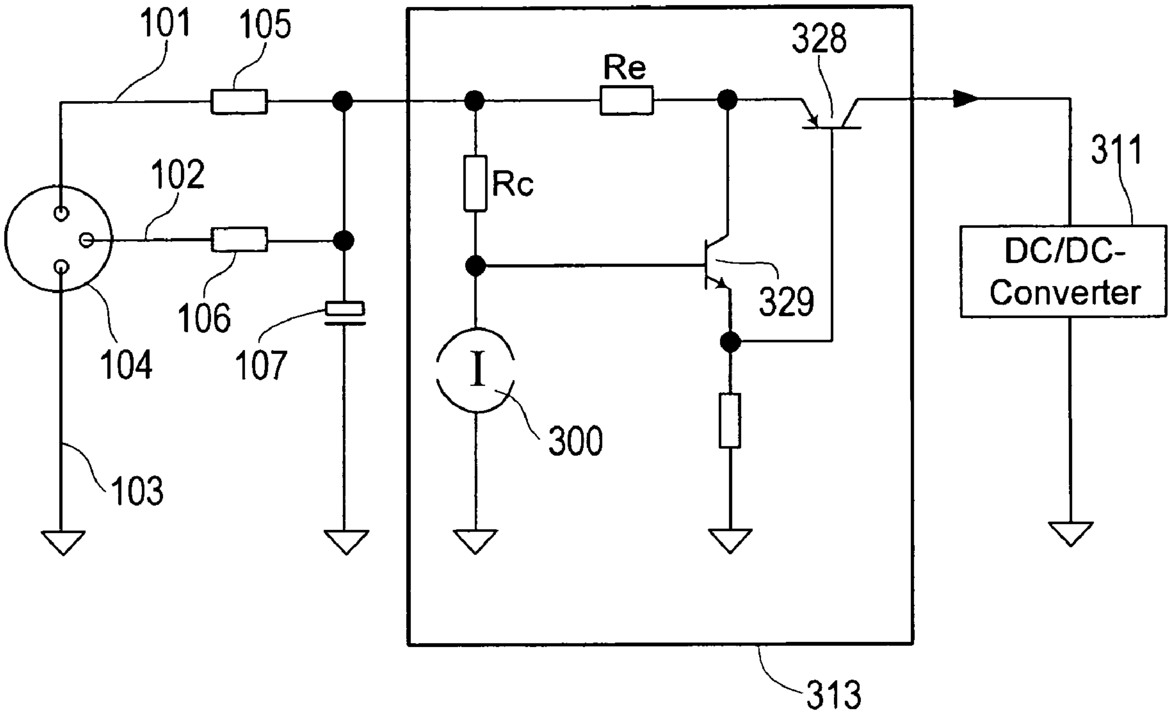
FIG. 3 is a circuit diagram of a cross-coupled transistor constant-current source.

FIG. 3 is a block diagram of another constant current generator 313. The constant current generator 313 may include two counter-coupled degenerated transistors 328 and 329. The constant current generator 313 also may include an integrated constant current generator 300. The current generator 300 develops a voltage drop, $U_{Rc}$ across a resistor Rc. The voltage $U_{Rc}$ approximately equals a voltage drop $U_{Re}$, at an emitter resistor Re of the transistor 328. The constant current developed by the constant current generator 300 is determined by:

$$I_{300}=U_{Rc}/Re \tag{2}$$

The transistor 329 and the transistor 328 may form a counter-coupled degenerated system that provides substantially equal voltage drops at the resistors Rc and Re. As a result, the current $I_{300}$ of the current generator 300 may remain constant. The current from the current generator 313 may be a factor of about 100 less than a constant current that finally flows into a DC/DC converter 311.

The constant current generators 213 and 313 may provide a constant current and a higher start resistance. However, a constant current generator used with the microphone system 100 is not limited to the constant current generators 213 and 313 previously described. Other types of constant current generators may include current generators with an inverted operation amplifier, such as Howland current generators.

In FIG. 1, the supply loop 116 for the microphone capsule 109 may include a regulation circuit 146 between the diode 118 and the resistor 108. The regulation circuit 146 may include a digital regulation circuit 147 and an analog regulation circuit 148, that control the polarization voltage applied to the microphone capsule 109. Control signals may be transmitted through one of the two cable conductors 101 and 102. In the supply loops 115 and 117, regulator circuits may be provided if voltage regulators are not provided in digital circuits. For instance, the microphone system 100 does not include a regulator circuit in the supply loop 115 for the audio amplifier 110. Thus, it may be possible to use excess power that is not used in other circuits in the microphone for the audio amplifier 110. Other circuits may include processors, control electronics, polarization voltage circuits for the microphone capsule 109, A/D or D/A converters, LED displays, etc. A higher audio output voltage may be achieved.

The supply voltage for the audio amplifier 110 may be greater than a voltage supplied from the phantom power supply 150. For example, by arranging the number of windings and the direction of the windings, it is possible to produce positive and/or negative supply voltages for the audio amplifier 110. If both a positive and a negative voltage are produced, the audio amplifier 110 may use the ground potential as a rest potential. The positive and negative supply voltage for the audio amplifier 110 may be symmetrical with respect to ground.

Figure 4:
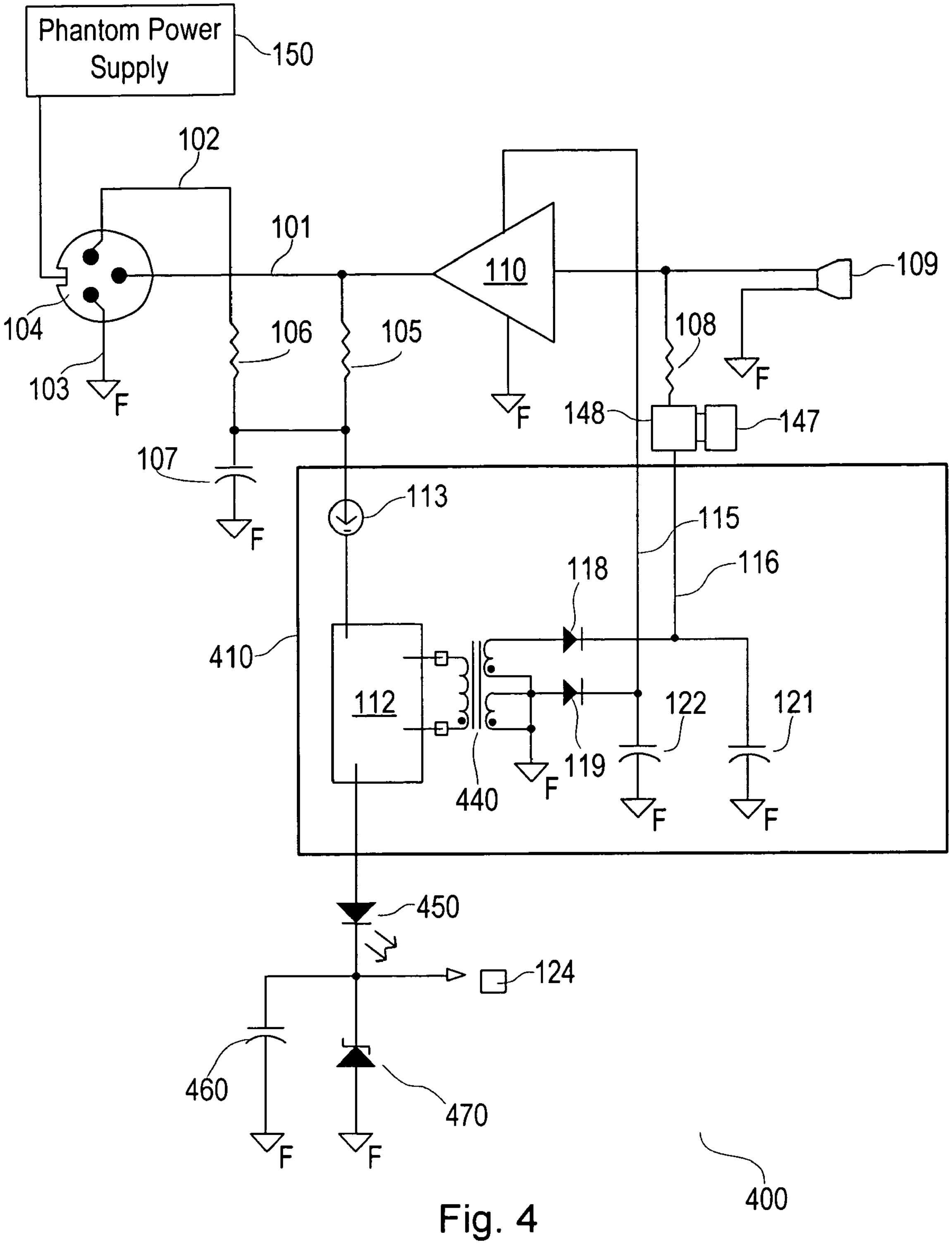
FIG. 4 is a block diagram of a capacitor microphone with a digital logic supply circuit.

FIG. 4 is a block diagram illustrating another example of a microphone system 400. The microphone system 400 may include a power supply 410 that generates a polarization voltage for the microphone capsule 109 and a voltage for the audio amplifier 110. Other circuits may receive power from the logic supply 124. The logic supply 124 may make a predetermined fixed direct current available to the circuits such as the control electronics and an LED display 450. The logic supply 124 may be connected in series to the power supply 410. The power supply 410 may act as an active load. Power consumed at the active load may not be converted into heat, but into usable power for the audio amplifier 110 and the polarization voltage for the microphone capsule 109.

The microphone system 400 may include a Zener diode 470 providing a reference voltage to the logic supply 124 or additional digital electronics. The Zener diode 470 may stabilize the supply voltage. The current consumed by the logic supply 124 may vary. The Zener diode 470 may pass the excess current from the constant current source 113 to the ground. In place of the Zener diode 470, other devices such as a constant-current generator or a shunt regulator may be used.

In the microphone system 100 of FIG. 1, power may be the product of the current of the constant current generator 113 and the voltage applied to the power supply 111. In FIG. 1, the entire voltage may be applied to the power supply 111. In FIG. 4, the supply voltage is applied to the power supply 410, the LED 450 and the logic supply 124. The logic supply 124 voltage may be determined by the Zener diode 427. The power supply 410 may represent an active resistance. The current consumption of the logic supply 124 may not be constant and may vary depending upon operation. However, the current by the current generator 113 remains constant. The excess current may develop depending on operation of digital electronics. The excess current may pass through the Zener diode 470. The power available for the audio amplifier 110 may be computed as follows:

$$P_{AA}=(I_{DC/DC})\times(V_{DC/DC})\times\eta \tag{3}$$

where $I_{DC/DC}$ is the current through the power supply 410, $V_{DC/DC}$ is the voltage across the power supply 410, and $\eta$ is the degree of efficiency of the power supply 410. The power supply 410 may lose some of power because power is dissipated by the transformers, resistors, capacitors and diodes during operation. Power loss may occur at the power supply 410 during DC/DC conversion. The power loss may be indicated as the efficiency η of the power supply 410. For instance, the degree of efficiency η may be approximately 82%. The power at the LED may be computed by:

$$P_{LED}=(I_{LED})\times(V_{LED}) \quad (4)$$

The LED displays, control electronics, etc. may avoid power loss by a series connection to the power supply 410 as shown in FIG. 4. These microphone electronics may be connected to the logic supply 124 and receive a constant direct current from the current generator 113.

By way of example, the current consumption of the audio amplifier 10 may be about 0.8 mA in an uncontrolled state and the current consumption of the digital electronics may be about 4.2 mA. The current generator 113 may deliver about 4.7 mA. The Zener diode will conduct about 0.5 mA to ground, which is the excess current. To improve the efficiency of the power supply 410, it may be advantageous to provide the voltage for the digital electronics through a series connection with the power supply 410. In other applications, it may be more advantageous to provide the voltages through the power supply 111, as shown in FIG. 1.

The supply voltage to the audio amplifier 110 may provide a higher available power from the amplifier 110. The power may be as follows:

$$P=4.7\ mA\times18\ \text{V}\times0.82=69\ mW \quad (5)$$

The voltage is found from the following:

$$\text{V}=P/I=69\ mW/0.8\ mA=55\ \text{V} \quad (6)$$

This voltage is higher than about 24 Volts supplied by the phantom power supply 150. Due to the polarization voltage generated on the membrane of the microphone capsule 9, the supply voltage to the audio amplifier 110 may be lower than about 55V. However, it is still much higher than 24 V provided by the phantom power supply 150.

FIG. 5 is a block diagram of a remote control system 500 for a microphone system 540 to regulate or change operational parameters. The parameters may include the sensitivity of a microphone, its directional characteristics, the voltage from the phantom power supply, a serial number, calibration data from manufacturers, signal attenuation, connectable filters for the audio signal, etc.

When a limited amount of parameters are available, the control signal may be represented by the value of the supply voltage. A supply voltage value may be applied to a cable conductor where the supply voltage is controlled via a remote power controller. In a mixer or mixing table, the value of the supply voltage may represent the control signal for the microphone. The value of the supply voltage is sensed at the microphone and routed to an evaluation circuit. The evaluation circuit may generate a control signal as a function of the value of the supply voltage. Few parameters may be transmitted to the microphone using this method of control.

A polarization voltage may be used to control the microphone sensitivity and reception parameters. When the polarization voltage is applied to the membrane of a capacitor microphone, the level of the polarization voltage may be directly related to the sensitivity of the microphone capsule. With a double membrane capacitor capsule, it may be possible to regulate the sensitivity and the directional characteristics when each membrane is separately supplied with the polarization voltage. The polarization voltage may be controlled with fixed value resistors or trim resistors. During initial assembly of the microphone, a one-time adjustment of the polarization voltage may occur. This adjustment may not be accurate if the sensitivity changes during the use or damage to the microphone capsules. Aging may play a role as well, as the membrane oxidizes or becomes fatigued from extended use. Thus, the polarization voltage may be compensated during sound checks at any time to offset the effects.

FIG. 5 illustrates a circuit where the control signal is a frequency modulated signal that superimposes the supply voltage over one of the two cable conductors. The frequency modulated signal at the microphone may be applied to the microphone control electronics. The microphone control electronics may demodulate the signal and send the commands to the appropriate device.

The frequency modulated signal may be a frequency shift keying (FSK) signal or continuous phase FSK (CPFSK) signal. Other modulation techniques such as amplitude shift keying (ASK) or phase shift keying (PSK) may be used, although the ASK modulation may be subject to interference, and the PSK modulation may be difficult to implement.

The microphone system may provide improved operational capabilities. The polarization voltage may be adjusted controlling the sensitivity and directional characteristic of the microphone. Other signals may send calibration data to a microprocessor for storage. Modifications to the frequency range audio output power, amplification, and total harmonic distortion (THD) of the audio amplifier 110 may be changed. Such controls may use high data rates.

The frequency modulated voltage may be superimposed on the supply voltage from the phantom power supply. A transmitter in the mixing table or in a device on the mixing table may send the control signals to the microphone via audio lines. The carrier frequency for FSK modulation may be higher than the audio frequency transmitted from the microphone. The frequency modulated signal allows for a higher data rate than the transmission of DC voltage levels. The carrier frequencies may be about 100 kHz and may be separated from the audio signal by using filters.

In the remote control system 500, the microphone system 540 may connect to a transmitter or a remote control unit 550. Microphone parameters may be remotely controlled directly through audio cable conductors 511 and 512. The remote control unit 550 may be a part of the mixer (not shown) or connected to the front end of the mixer. The remote control unit 550 may include a microcontroller 535 with a parameter control input 534 that controls a frequency modulator 536. The frequency modulator 536 may apply the frequency modulated signal at substantially the same level to the two cable conductors 511 and 512. The frequency-modulated signal may be suppressed as a common mode signal in a differential input amplifier 542. A supply voltage from a phantom power supply 531 may be applied through feeder resistors 532 and 533 to the cable conductors 511 and 512. The frequency modulated signal may be applied on one conductor 512 of the audio cable. As such, the conductor 512 may not be used for the audio signal.

The microphone 540 may include a filter 537, a comparator 538, control electronics 539 and a capacitor 543. The filter 537 may separate the frequency modulated voltage from the audio signal. A band pass filter may be used as the filter 537. Even when the frequency modulated signal is fed into the conductor 512, the capacitive coupling between the two conductors 511 and 512 may cause interference with the audio signal. The capacitive coupling depends on the structure and the length of the audio cable.

The control electronics 539 may evaluate the control information that is received. The control electronics 539 may be a microcontroller or a CPLD (Complex Programmable Logic Device). The cable conductor 512 is uncoupled through a capacitor 543 to ground. The control electronics 539 are connected to a comparator 538 functioning as a voltage comparator. Commands from the control electronics 539 may be sent to the power supply 111, the audio amplifier 110, processors, A/D or D/A converters 440 of FIGS. 1 and 4.

The audio signals from the microphone system 540 may be transmitted to the mixer or mixing table. To suppress the modulation frequency from the remote controller, the modulation may be applied to both audio lines 1 and 2 at about the same level. The frequency modulated signal may be a common mode signal to the differential input amplifier 542 and appropriately suppressed as a common mode signal. Alternatively, the frequency modulation may be applied to one line 512 and that line does not transmit the audio signal. The frequency modulated signals may be filtered by a low pass filter 541 at the mixer or mixing table.

After receiving a control signal, the control electronics 539 may acknowledge the receipt to improve the reliability of the system. The acknowledge message may be a frequency modulated signal. However, an acknowledgement may be omitted.

The phantom power supply 531, including the feeder resistors 532 and 533, the differential input amplifier 542 and the low pass filter 541, may be integrated within the remote control unit 550 as shown in FIG. 5. Alternatively, or additionally, the phantom power supply 531 and other components may be integrated within the mixer. The microphone system 540 of FIG. 5 is not limited to capacitor microphones. Other types of microphones may be used such as dynamic microphones. The components in the microphones may receive power from the phantom power supply 531.

Figure 6:
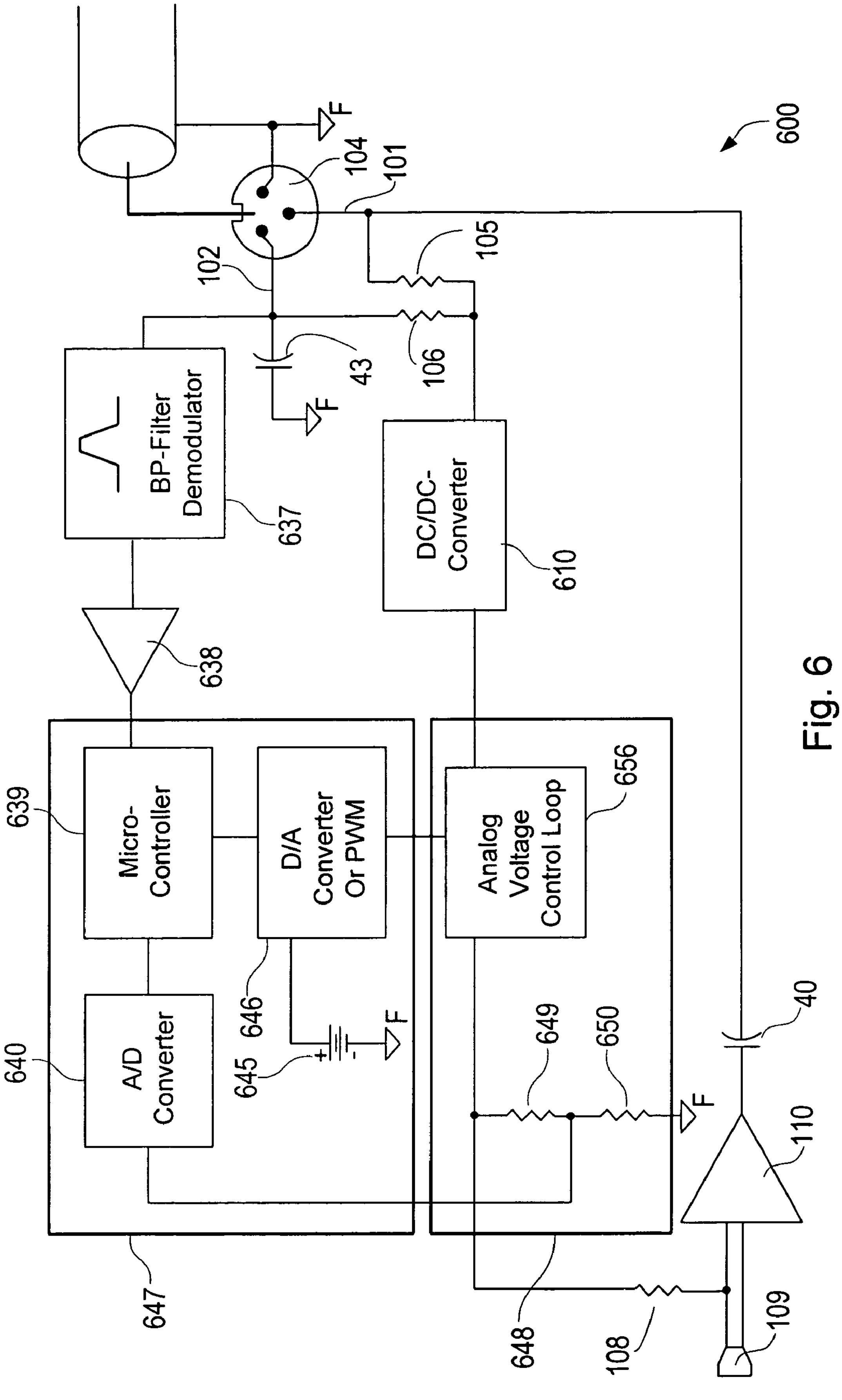
FIG. 6 is a block diagram of a circuit that adjusts a polarization voltage.

FIG. 6 is a block diagram of another example of a capacitor microphone 600. The capacitor microphone 600 may include a circuit for regulating a polarization voltage such as the regulation circuit 147 and 148 of FIG. 1. The circuit may include an analog regulator circuit 648 that is supplied with an unregulated voltage and is connected to a digital regulator circuit 647. The digital regulator circuit 647 may include control electronics 639 that provide a desired value for a polarization voltage. The value of the polarization voltage may be calculated from correction factors that may have been determined during sound checks. For providing feedback, the output of the analog regulation loop 648 may be connected to the control electronics 639. The capacitor microphone may satisfy low tolerances with respect to the polarization voltage, for example, a tolerance of about ±0.5 dB. The flexible adjustment of the polarization voltage may be possible during the assembled state of the microphone system 600.

The polarization voltage may be adjusted by the digital regulator circuit 647. The value of the polarization voltage may be established through a D/A converter 646 and the control electronics 639. The desired value of the polarization voltage also may be transmitted to the control electronics 639 by a remote control. The tolerance of the acquired polarization voltage may depend on the tolerance and the thermal behavior of a reference voltage source. The reference voltage source may be the voltage provided to the logic source 124.

In conjunction with FIG. 5, the frequency modulated signal, transmitted through the cable conductors 511 and 512, may be connected to the phantom power supply 531. The frequency modulated signal may be received by the control electronics 639 via a band-pass filter/demodulator 637 and a comparator 638. Alternatively, the control electronics 639 may be connected to a radio or an infrared interface for wireless transmission. Instead of the D/A converter 646, a pulse width modulation (PWM) circuit may be used. Although a PWM circuit has lower conversion rates, it may be cost efficient and suitable for adjusting constant levels.

The regulation of the polarization voltage via the digital regulator circuit 647 may provide a precise, interference resistant, and remote controllable adjustment of the polarization voltage. During manufacture, narrow tolerance requirements may be achieved with respect to the sensitivity and directional characteristic. Readjustments by fixed resistances or trim resistances may not be needed.

Remote control of the polarization voltage provides varying directional patterns/characteristics, and adjustable microphone sensitivities for double membrane microphone capsules. Correction factors may be calculated and stored to compensate the polarization voltage. The polarization voltage may be calibrated during acoustical measurements with a closed microphone and correction factors may be stored. The adjustable polarization voltage using the remotely controlled microphone may provide directional effects during operation. For example, the microphone may acoustically follow the movement of actors who are performing on a stage.

Remote control of the microphone may compensate for the aging effects of the membrane and allow for the recalibration of the microphone sensitivity. After replacement of the microphone capsule, the sensitivity of the microphone may be readjusted by remote control.

Figure 7:
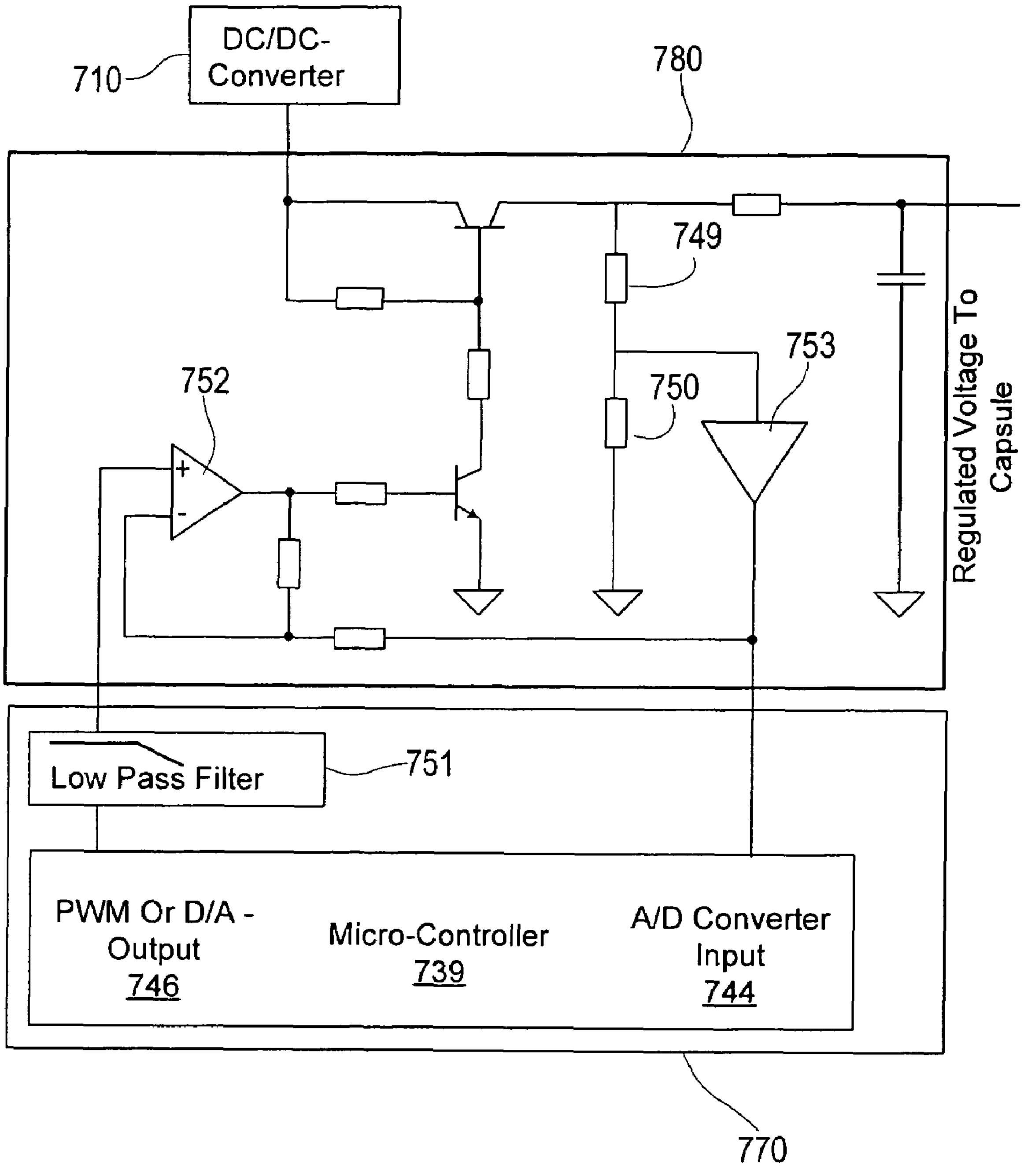
FIG. 7 is a control circuit for adjusting the polarization voltage.

FIG. 7 is a block diagram of a digital regulation loop 770 and an analog regulation loop 780. The digital regulation loop 770 may include a microcontroller 739, an A/D converter 744, a D/A converter 746 and a low pass filter 751. A PWM may be used in place of the D/A converter 746. The analog regulation loop 780 may include voltage dividers 749 and 750, an operation amplifier 752 and an impedance converter 753. A DC/DC converter 710 may provide an unregulated voltage of about 100~120 Volts to the analog regulation loop 780.

The desired value may be compared with an actual value by the operation amplifier 752. The desired value may be calculated from the calibration data measured during manufacture of a microphone and programmed into the microcontroller 739. As a reference value for this calculation, either a reference voltage such as a reference voltage 645 of FIG. 6 on the conductor or a reference voltage programmed into the microcontroller 739 may be used. The reference voltage may be from a logic supply such as the logic supply 124 of FIG. 4.

To suppress high frequency interference from the analog regulation circuit 780, the low pass filter 751 may be connected between the D/A converter 746 and the input of the analog regulation loop 780 as illustrated in FIG. 7. The analog regulation loop 780 may develop the feedback signal with the voltage dividers 749 and 750, applying the signal through the impedance converter 753 to the inverted input of the operation amplifier 752. The feedback line and the impedance converter 753 may not be included. The feedback signal may be applied to an input of an A/C converter 744 in the digital regulation loop 770. The digital signal is fed to the microcontroller 739. The outer digital regulator circuit 770 is a closed feedback loop. The A/D converter 744, the microcontroller 739, and the D/A converter 746 may be integrated within one package.

The regulated polarization voltage may be applied to the microphone capsule 109 via a high resistance. Correction factors may be available to calculate a regulated and interference free polarization voltage depending on different settings, reflecting various sensitivities, guide characteristics, and aging parameters. The correction factors may be stored in a memory located in the microcontroller 739. The correction factors may be entered by the remote control. For example, a Service Department, a distributor, and/or a customer may change the correction factors as required. Besides the possible correction of microphone properties resulting from aging or replacement of the microphone capsule, an on-site customized tuning of microphones may be possible.

Figure 8:
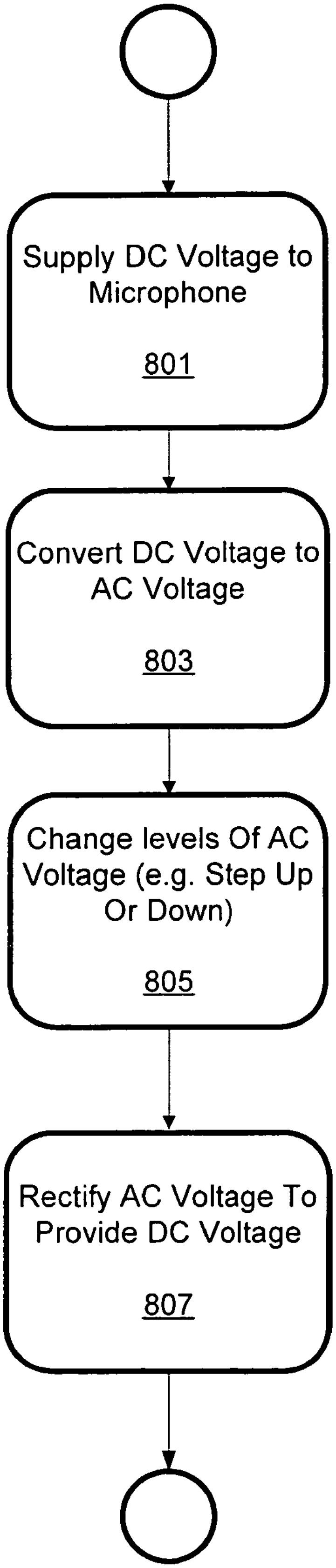
FIG. 8 is a flow diagram for adjusting the polarization voltage.

A flow diagram for supplying power to a microphone system is shown in FIG. 8. A DC voltage may be supplied to the microphone system (act 801). The voltage may be supplied from a phantom power supply. Additional power source also may be provided. The DC voltage may be provided to a power supply such as the power supply 111 and 410 in FIGS. 1 and 4. To change levels, the DC voltage may be converted to an AC voltage through an analog digital converter (act 803). The analog digital converter may be a control unit such as the control unit 112. The AC frequency may be about 100 kHz to about 130 kHz. The AC voltage may be supplied to a transformer such as the transformer 14 of FIG. 1 that may have multiple secondary coils, where each coil provides a secondary voltage (act 805) specific to the supplied circuit.

The secondary voltage may be rectified to provide a DC voltage (act 807). A polarization voltage, a supply voltage for an audio amplifier, and an operational voltage for another electronic circuit or device may be supplied (act 807). The polarization voltage may be applied to a microphone capsule. The supply voltage may be stepped up to a value greater than the DC voltage supplied from the phantom power supply. The operational voltage may be provided to the electronic circuit or device such as control electronics, LED displays, A/D converter, etc.

Figure 9:
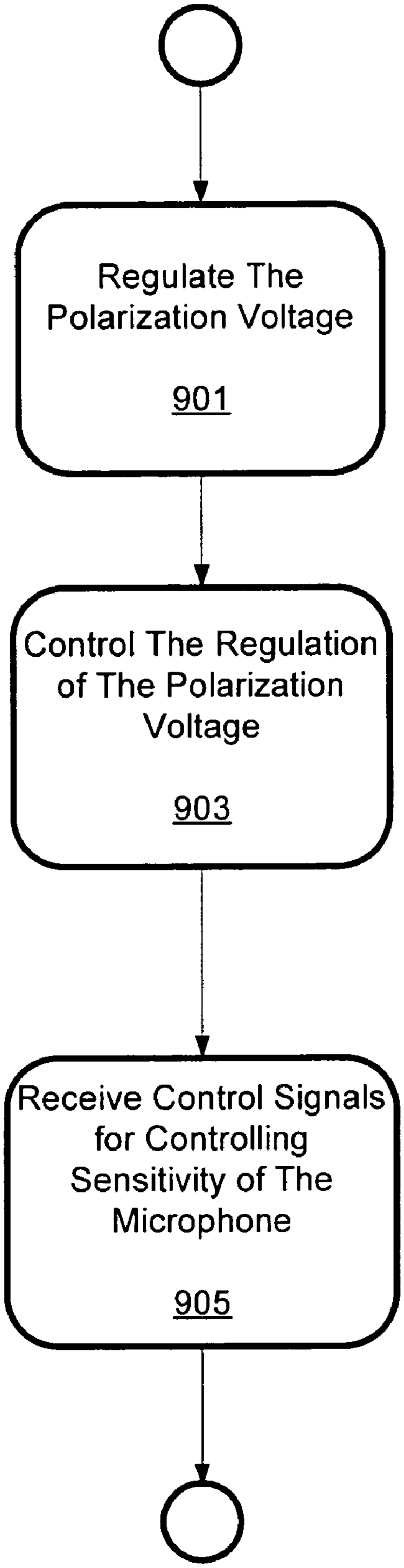
FIG. 9 is a flow diagram for regulating a polarization voltage.

A flow diagram for a method of regulating a polarization voltage is shown in FIG. 9. The polarization voltage may be regulated (act 901) to provide a consistent output by adjusting the polarization voltage to a microphone capsule such as the microphone capsule 109 of FIGS. 1 and 4. The regulation of the polarization voltage may be controlled (act 903) by a microcontroller 739 and a regulation circuit 770 such as the digital regulation circuits 47, 670 and 770 and the analog regulation circuits 48, 680 and 780 of FIGS. 1, 6 and 7. The microcontroller 739 of the digital regulation circuit 770 may have a reference voltage and/or correction factors to set the polarization voltage.

Control signals may be transmitted (act 905) from a remote location such as a mixing table or mixing board to control the sensitivity of the microphone capsule 109. At act 905, the signals may be sent under the guidance of a technician as an actor traverses a sound stage and the system adjusts the microphone capsule sensitivity to pick up the actor's voice. The correction factors may be provided to the microcontroller as part of calibrating the microphone. As the diaphragm ages, the correction factors may be used to offset any instabilities or degradations that occur.

Figure 10:
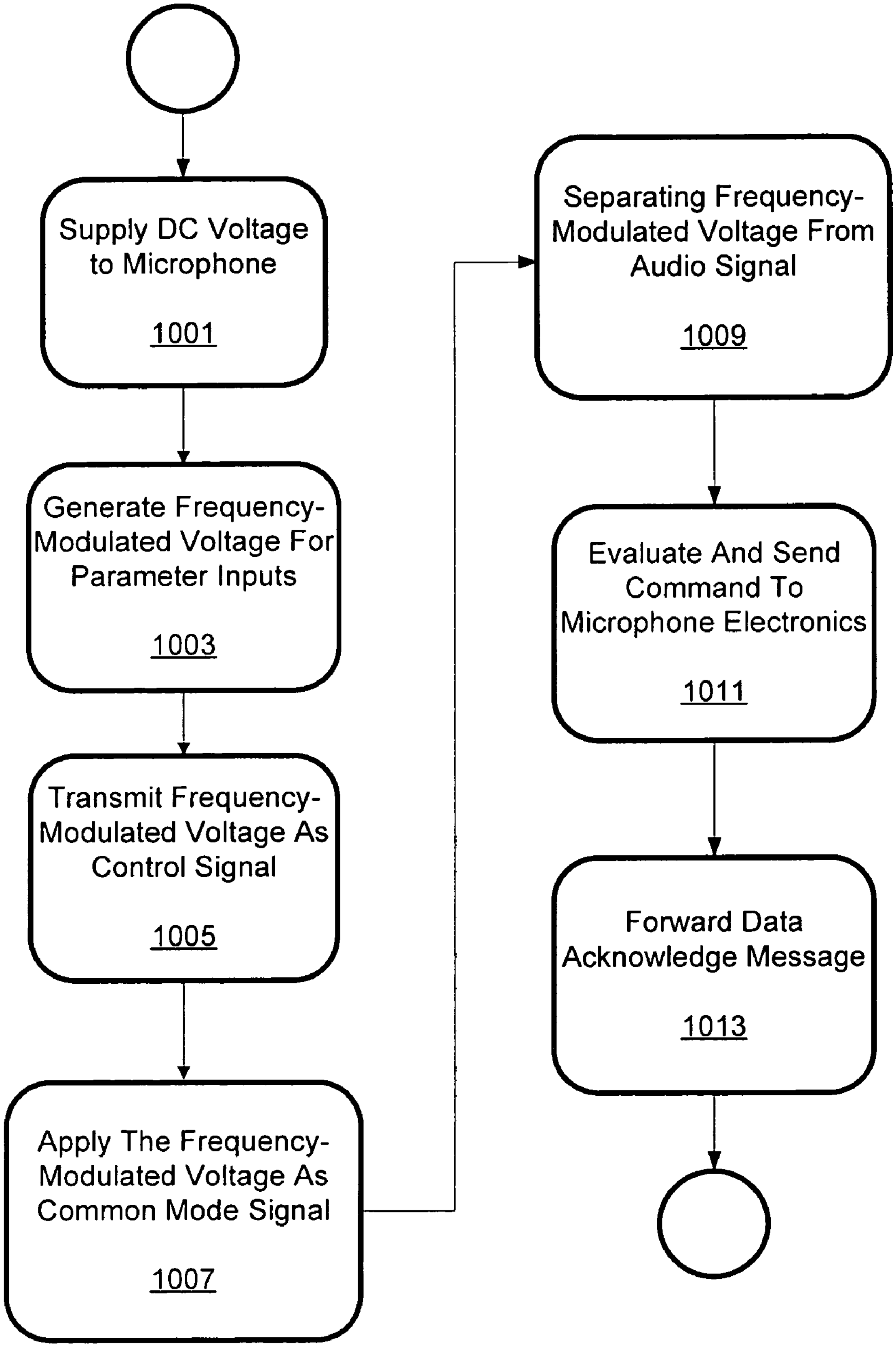
FIG. 10 is a flow diagram for a method of remotely controlling a microphone.

A flow diagram of a method for remotely controlling a microphone system is shown in FIG. 10. A DC voltage may be supplied to a microphone system from a phantom power supply (act 1001). A frequency-modulated voltage signal, which includes control signals to control microphone parameters, may be generated (act 1003). The frequency-modulated signal may be transmitted through cable conductors that conduct the DC power from the phantom power supply (act 1005). The frequency-modulated signal may be transmitted to the microphone system and suppressed toward the mixer (act 1007). A differential input amplifier may suppress the modulated signal as a common mode signal (act 1007). In the microphone system, the frequency-modulated voltage may be separated from the audio signals (act 1009). A microcontroller in the microphone system may evaluate control information contained in the control signal and send the control information to the microphone electronics (act 1011). The microphone electronics may transmit a data acknowledge message (act 1013) to the remote control unit. The acknowledgement (act 1013) is not a necessary element and may be omitted.

The power supply in the microphone system may provide optimal voltages to the microphone capsule, the audio amplifier and to other microphone electronics. In particular, the power supply may generate and provide a stable and controlled polarization voltage. The polarization voltage may be regulated based on the correction factors, which in turn improves the sensitivity of the microphone system. Other parameters of the microphone system may be adjusted so that the entire sensitivity of the microphone system improves. The regulation of the microphone parameters includes remote control.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A method for remotely controlling a plurality of parameters of a microphone system comprising:

providing a DC voltage through at least two cable conductors;

generating different levels of voltages based on the DC voltage from a phantom power supply, the different levels of voltages including a polarization voltage, a supply voltage and an operational voltage;

generating a control signal operable to control the plurality of parameters of the microphone system, where the control signal is frequency-modulated;

regulating the polarization voltage based on a desired value determined in the control signal; and supplying the control signal to the microphone system through the two cable conductors.

2. The method of claim 1, further comprising: suppressing the frequency-modulated control signal to the cable conductors as a common mode signal by a differential input amplifier.

3. The method of claim 1, further comprising:

transmitting an audio signal;

transmitting the frequency-modulated control signal; and separating the frequency-modulated control signal from the audio signal by a differential input amplifier.

4. The method of claim 1, further comprising:

transmitting an audio signal;

transmitting the frequency-modulated control signal; and separating the frequency-modulated control signal from the audio signal by a low-pass filter.

5. The method of claim 1, further comprising: forwarding a data acknowledge message from the microphone electronics to a remote control unit in response to the control signal.

6. The method of claim 5, further comprising frequency-modulating the data acknowledge message.

7. The method of claim 1, further comprising:

generating a control command in response to the control signal; and providing the control command to microphone electronics.

8. The method of claim 7, where the supplying the control signal comprises superimposing the control signal on the DC voltage from the phantom power supply during transmissions to the microphone system.

9. A remote control system, comprising:

a microphone system comprising at least two cable conductors connected to a microphone capsule via an audio amplifier;

a remote control unit configured to be in communication with the microphone system, the remote control unit comprising:

a parameter control input that provides an input for controlling a plurality of parameters of the microphone system; and a frequency modulator coupled to the parameter control input and operable to modulate a control signal; and a phantom power supply that provides a DC voltage through the two cable conductors to the microphone system wherein the control signal is superimposed on the DC voltage from the phantom power supply.

10. The remote control system of claim 9, further comprising a mixer connected to the remote control unit, the mixer supplying a power to the remote control unit and the microphone system.

11. The remote control system of claim 9, where the frequency modulator is operable to provide the modulated control signal to one of the two cable conductors.

12. The remote control system of claim 11, where the modulated control signal is provided to a conductor that is substantially free of an audio signal.

13. The remote control system of claim 9, where the remote control unit further comprises a differential input amplifier operable to suppress the modulated control signal.

14. The remote control system of claim 9, where the remote control unit further comprises a low pass filter operable to suppress the modulated control signal.

15. The remote control system of claim 9, where the microphone system further comprises a filter operable to separate the modulated control signal from an audio signal.

16. The remote control system of claim 15, where the microphone system further comprises a controller operable to evaluate control information contained in a separated control signal.

17. The remote control system of claim 16, where the microphone system further comprises microphone electronics and the controller transmits to the microphone electronics a command based on the control information.

18. The remote control system of claim 9, where the phantom power supply is integrated with the remote control unit.

* * * * *